(12) United States Patent
Gaskin

(10) Patent No.: US 6,698,237 B2
(45) Date of Patent: Mar. 2, 2004

(54) USE OF STRIPPING GAS IN FLASH REGENERATION SOLVENT ABSORPTION SYSTEMS

(75) Inventor: Thomas K. Gaskin, Spring, TX (US)

(73) Assignee: Advanced Extraction Technologies, Inc., Houston, TX (US)

(*) Notice: Subject to any disclaimer, the term of this patent is extended or adjusted under 35 U.S.C. 154(b) by 0 days.

(21) Appl. No.: 10/315,745

(22) Filed: Dec. 10, 2002

(65) Prior Publication Data

US 2003/0106334 A1 Jun. 12, 2003

Related U.S. Application Data

(60) Provisional application No. 60/339,591, filed on Dec. 11, 2001, and provisional application No. 60/359,383, filed on Feb. 25, 2002.

(51) Int. Cl.[7] .................................................. F25J 3/00
(52) U.S. Cl. .......................................... 62/632; 62/636
(58) Field of Search ......................... 62/617, 618, 632, 62/635, 636

(56) References Cited

U.S. PATENT DOCUMENTS

| | | | |
|---|---|---|---|
| 4,623,371 A | 11/1986 | Mehra | 62/17 |
| 4,680,042 A | 7/1987 | Mehra | 62/17 |
| 4,832,718 A | 5/1989 | Mehra | 62/17 |

OTHER PUBLICATIONS

Yuv R. Mehra, "Mehra Process Flexibility Improves Gas Processing Margins" Presented at 66th Annual GPA Convention Mar. 16–18, 1987, Denver, Colorado.

Primary Examiner—Henry Bennett
Assistant Examiner—Malik N. Drake
(74) Attorney, Agent, or Firm—Howrey, Simon, Arnold & White, LLP

(57) ABSTRACT

A process and apparatus for separating the components of a hydrocarbon gas feed stream is disclosed. A multi-component hydrocarbon gas feed stream is contacted with a solvent in an absorber to produce a first overhead stream that is enriched in a first component and a rich solvent bottoms stream that is enriched a second component. The rich solvent bottoms stream is flash vaporized to recover the second component as a second overhead stream and to produce a lean solvent stream that is returned to the absorber. During the flash vaporization process, the rich solvent bottoms stream is contacted with a stripping gas that is a portion of the first overhead stream. This stripping process enhances the recovery of the second component during the flash vaporization.

23 Claims, 4 Drawing Sheets

(Comparative Example)

USE OF STRIPPING GAS IN FLASH REGENERATION SOLVENT ABSORPTION SYSTEMS

CROSS REFERENCE TO RELATED APPLICATIONS

This application is a non-provisional application of U.S. Provisional Patent Application Ser. No. 60/339,591 filed Dec. 11, 2001, and U.S. Provisional Patent Application Ser. No. 60/359,383 filed Feb. 25, 2002, the entire contents of which are incorporated herein by reference.

BACKGROUND

There are many instances when it is necessary to separate the components of a gas stream or to provide a stream that is a given purity with respect to a particular gas. For example, many hydrocarbon gases such as natural gas, thermally or catalytically cracked gas, or refinery off gas are contaminated with one or more inert gases which lower their heat content or otherwise impair their marketability. Such inert gases include nitrogen, helium, and argon. Contamination of natural gas with nitrogen is particularly common and it is often desirable to separate the nitrogen from the natural gas.

Likewise, oil may be contaminated with nitrogen that is a natural component or that is derived by nitrogen injections for reviving oil wells, as is common in the central and north Texas areas of the United States. When oil is contamination with nitrogen, the oil producer may be forced to curtail oil production because government regulations prevent him from burning the nitrogen-rich associated gas and both environmental laws and a desire to preserve valuable resources prohibit him from venting the associated gas into the atmosphere. The oil producer is thus limited by the choices of technology available to him for processing the associated gases from an oil well. The prior art technology, which involves cryogenic techniques, cannot economically process the natural gas streams which contain more than 3 mol % nitrogen, even after subsidization with the revenue from oil production.

Olefins such as ethylene and propylene are commonly present in thermally or catalytically cracked gas streams or in refinery off gases. These gases generally comprise methane, carbon monoxide, carbon dioxide, acetylene, ethane, methyl acetylene, propadiene, propylene, propane, butadienes, butenes, butanes, $C_5$'s, $C_6$–$C_8$, non-aromatics, benzene, toluene, xylenes, ethyl benzene, styrene, $C_9$ –400° F. gasoline, 400+° F. fuel oil, and water. These olefin-containing streams are commonly associated with large quantities of hydrogen.

Numerous processes are known for isolating and recovering olefins from cracked, refinery, and synthetic gases. Some processes utilize specific paraffinic compounds as an absorption oil while others utilize an aromatic absorption oil as a solvent within an absorber column or an absorber-stripper column having a reboiler. Some of these processes additionally isolate a methane-rich stream and/or a hydrogen-rich stream.

It is often desirable to provide a gas stream that is a given purity with regard to a specific gas. A wide variety of gaseous streams are found in petroleum refineries. Some streams are integral parts of a specific process, such as those that are recycled from a fractionating column to a reactor. Such a recycle stream may be an impure hydrogen stream which must be purified before returning to the reactor and/or combining with a make-up hydrogen stream. Other such gaseous streams may be a byproduct of a major refinery process and may be sent to one or more other processes which are nearby and which require a hydrogen feed stream of a specific purity.

As crudes having higher sulfur content and higher carbon-to-hydrogen ratio continue to be processed and as stricter environmental regulations requiring lower sulfur content arise, hydrogen demand is expected to grow. Even though a substantial portion of this increased demand will be met by steam reforming of light hydrocarbons and partial oxidation of heavy hydrocarbons, upgrading of existing off-gas streams is a viable alternative for supplying the needed hydrogen.

For example, the byproduct hydrogen stream from an ethylene cracking plant may have a hydrogen content of 75 mol % whereas the feed to a hydrodealkylation process may require 95 mol % hydrogen. A change in process conditions at a nearby hydroforming plant may create a demand for 99 mol % hydrogen and therefore require the purification of a 90% hydrogen byproduct stream that happens to be available. These examples demonstrate the need for the ability to change selectively from one hydrogen purity to another without having to change equipment specifications.

There are many small to medium size off-gas streams that contain hydrogen and heavier hydrocarbons which are currently being sent to the fuel systems of petroleum refineries. A summary of various hydrogen source streams containing approximate concentrations of hydrogen is published in *Oil and Gas Journal,* Feb. 6, 1984, p. 111, by Wang et al. In most of the refinery and petrochemical applications where hydrogen is used as a reactant, the desired makeup hydrogen has a purity of about 95%. In order to prevent the build-up of reaction byproducts, such as methane, a portion of the recycle stream is customarily purged. Even though such a stream is relatively small, its concentration of hydrogen represents a loss which must be offset by additional hydrogen make-up.

Several processes have been used and are currently available for upgrading the quality of such off-gas streams. These processes, as described by Wang et al. in the *Oil and Gas Journal* article of Feb. 11, 1984, include cryogenic separation, catalytic purification, pressure swing adsorption, and membrane separation. Selection of a suitable process depends upon many factors, some of which are the hydrogen product purity that is desired, hydrogen recovery levels, available pressure drop, pretreatment requirements, off-gas composition, impact of reaction products remaining in the hydrogen product, and turndown capability of the selected process.

The bulk of the industrial hydrogen manufactured in the United States uses the process of steam reforming of natural gas according to the equation $2CH_4+3H_2O \rightarrow CO+CO_2+7H_2$. Other processes utilize partial oxidation of resids, coal gasification, and water hydrolysis. Supplying hydrogen by purifying various refinery waste gases is nearly always more economical than hydrogen production by steam reforming. The composition of the raw gas and the amount of impurities that can be tolerated in the product generally determine the selection of the most suitable process for purification.

The impurities usually found in raw hydrogen are $CO_2$, CO, $O_2$, $N_2$, $H_2O$, $CH_4$, $H_2S$, and higher hydrocarbons. These impurities can be removed by shift catalysis, $H_2S$ and $CO_2$ removal, PSA process, and nitrogen wash.

An improved extractive flashing version and an improved extractive stripping version of the Mehra Process are respectively described in U.S. Pat. Nos. 4,623,371 and 4,680,042, the entire contents of which are incorporated herein by reference, for separating $C_{2+}$ hydrocarbons from a nitrogen-rich hydrocarbon gas containing from 3 to 75 mol % nitrogen, the remainder being hydrocarbons.

U.S. Pat. No. 4,832,718, the entire contents of which are incorporated herein by reference, describes a continuous process for separating components of a hydrocarbon gas stream which are selected from the group consisting of hydrogen, nitrogen, methane, ethylene, ethane, higher saturated and unsaturated hydrocarbons, and mixtures thereof by countercurrently contacting the hydrocarbon gas stream with a physical solvent to produce an overhead stream which is rich in at least one of the components and a rich solvent bottoms stream; and by recovering the lean physical solvent from the rich solvent bottoms stream and recycling the recovered stream to the contacting of step. While this process is quite effective, it would be desirable to increase the efficiency of the absorption and the recovery of the desired product from the solvent.

SUMMARY OF THE INVENTION

One aspect of the present invention is process and apparatus for separating the components of a hydrocarbon gas feed stream. The hydrocarbon gas feed stream comprises at least a first and second component and typically comprises several components, for example, hydrogen, nitrogen, methane, ethylene, ethane, heavier saturated and unsaturated hydrocarbons and mixtures thereof. Examples of such gas streams include those produced in petroleum refining and in natural gas recovery.

The process comprises contacting the gas stream with a solvent in an absorber to produce a first overhead stream that is enriched in at least the first component and a rich solvent bottoms stream that is enriched in at least the second component. The rich solvent bottoms stream is flash vaporized to recover the second component as a second overhead stream and to produce a lean solvent stream that is returned to the absorber. During the flash vaporization process, the rich solvent bottoms stream is contacted with a stripping gas that is a portion of the first overhead stream. This stripping process enhances the recovery of the second component during the flash vaporization. Because the stripping process removes more of the second component from the rich solvent bottoms, the resulting lean solvent is leaner and more capable of absorbing the second component when the lean solvent is returned to the absorber stage.

BRIEF DESCRIPTION OF THE DRAWINGS

FIG. 1 is shown as a comparison.

DESCRIPTION OF ILLUSTRATIVE EMBODIMENTS

Figure 1:
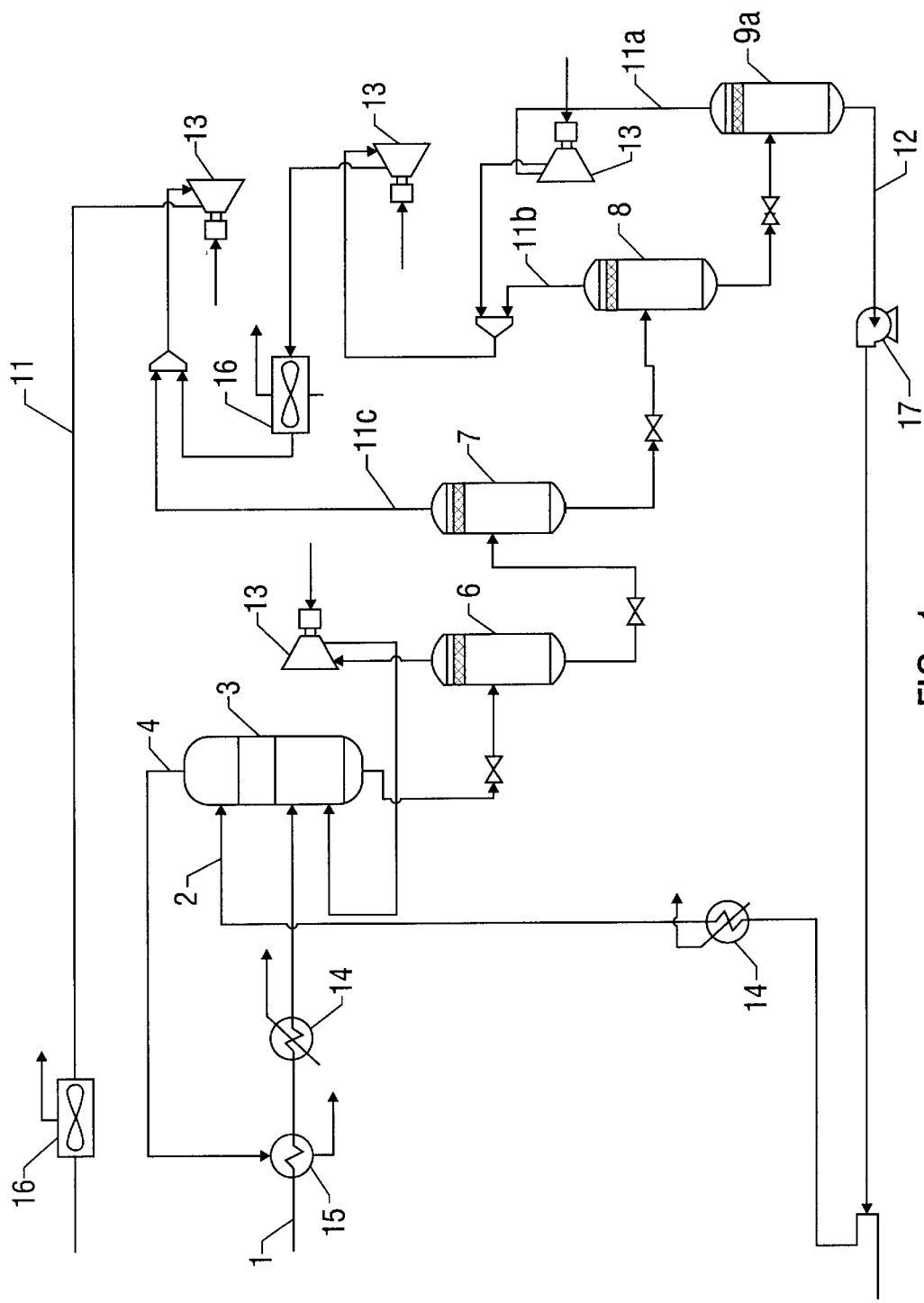
FIG. 1. A process for separating the components of a gas feed stream wherein the process does not include a conduit for contacting the rich solvent bottoms with a stripping gas that comprises a portion of the overhead stream.

It should be understood that pipelines are in fact being designated when streams are identified hereinafter and that streams are intended, if not stated, when materials are mentioned. Moreover, flow-control valves, temperature regulatory devices, pumps, and the like are to be understood as installed and operating in conventional relationships to the major items of equipment which are shown in the drawings and discussed hereinafter with reference to the continuously operating process of this invention. All of these valves, devices, and pumps, as well as heat exchangers, accumulators, condensers, and the like, are included in the term, "auxiliary equipment." The term "absorber" is conventionally employed for a gas/solvent absorbing apparatus, but when it is utilized in the process of this invention with a physical solvent, it is considered to be an "extractor."

One aspect of the present invention provides a method and an apparatus for separating the components of a hydrocarbon gas feed stream by contacting the gas stream in an absorber with a solvent which preferentially absorbs one or more of the components of the stream, thereby producing a first overhead stream that is enriched in at least one of the components and a rich solvent bottoms stream that is enriched in at least one of the other components. The enriched solvent bottoms stream is flash vaporized in at least one reduced pressure stage while being simultaneously contacted with a stripping gas. The stripping gas comprises a portion of the first overhead stream. The flash vaporization/stripping stage produces a second overhead stream that is enriched in the absorbed component and a lean solvent stream that is returned to the absorber.

The gas feed stream typically comprises components selected from the group consisting of hydrogen, nitrogen, methane, ethylene, ethane, heavier saturated and unsaturated hydrocarbons and mixtures thereof. For example, if the hydrocarbon gas feed stream contains hydrogen and methane, contacting the gas feed stream with a solvent will produce an overhead stream that is enriched in hydrogen and a rich solvent bottoms stream that is enriched in methane. In this example, it will typically be the hydrogen rich overhead stream that is the desired component, which will either be isolated or diverted to some processes with a hydrogen requirement. This being the case, it would be not be apparent to one of skill in the art to divert a portion of this stream to the reduced pressure stage to be used as a stripping gas. However, this stripping stage causes more of the methane to be recovered from the rich solvent and increases the ability of the recirculated solvent to absorb methane, thereby producing a higher purity hydrogen overhead stream when it contacts the feed gas. Surprisingly, this effect outweighs the loss incurred by diverting some of the desired overhead stream. An operator can control the amount of overhead stream that is diverted to the stripping stage and thereby control the final purity of the overhead stream.

As an alternative example, if the gas feed stream comprises nitrogen and methane, contacting the feed stream with a solvent will produce an overhead stream that is enriched in nitrogen and a rich solvent bottoms stream that is enriched in methane. In this case, it is most likely the methane that is dissolved in the rich solvent bottoms that is the more desired component. It would therefore not be apparent to one of skill in the art to contact the rich solvent bottoms with a portion of the nitrogen-containing overhead stream, because doing such will contaminate the stripped methane with nitrogen. However, this stripping stage allows more of the methane to be stripped from the rich solvent bottoms, resulting in a higher recovery of methane. The recirculated solvent will have a greater capacity to absorb methane from the gas feed stream, resulting in lower emissions of methane in the vented nitrogen overhead stream and a higher recovery of methane as a saleable product. Further, the stripping gas will dilute the amount of the lightest absorbed component (methane in this case) in any small bubbles of vapor that are not separated from the solvent and that are returned to the contacting stage, thereby reducing the negative effect of any vapor entrainment in the recirculated solvent. Surprisingly, these effects outweighs the effect of potentially contaminating the methane with the stripping gas. The effect of stripping gas on the solvent can be enhanced by addition of heat.

The solvent can be one of the components of the hydrocarbon gas feed stream, for example, the heaviest component. Alternatively, the solvent can be an external solvent that is added to the process. According to one embodiment, the solvent is selected from the group consisting of paraffinic solvents, naphthenic solvents, benzene and toluene. According to one embodiment, the hydrocarbon gas feed stream is counter-currently contacted with the solvent.

Figure 2:
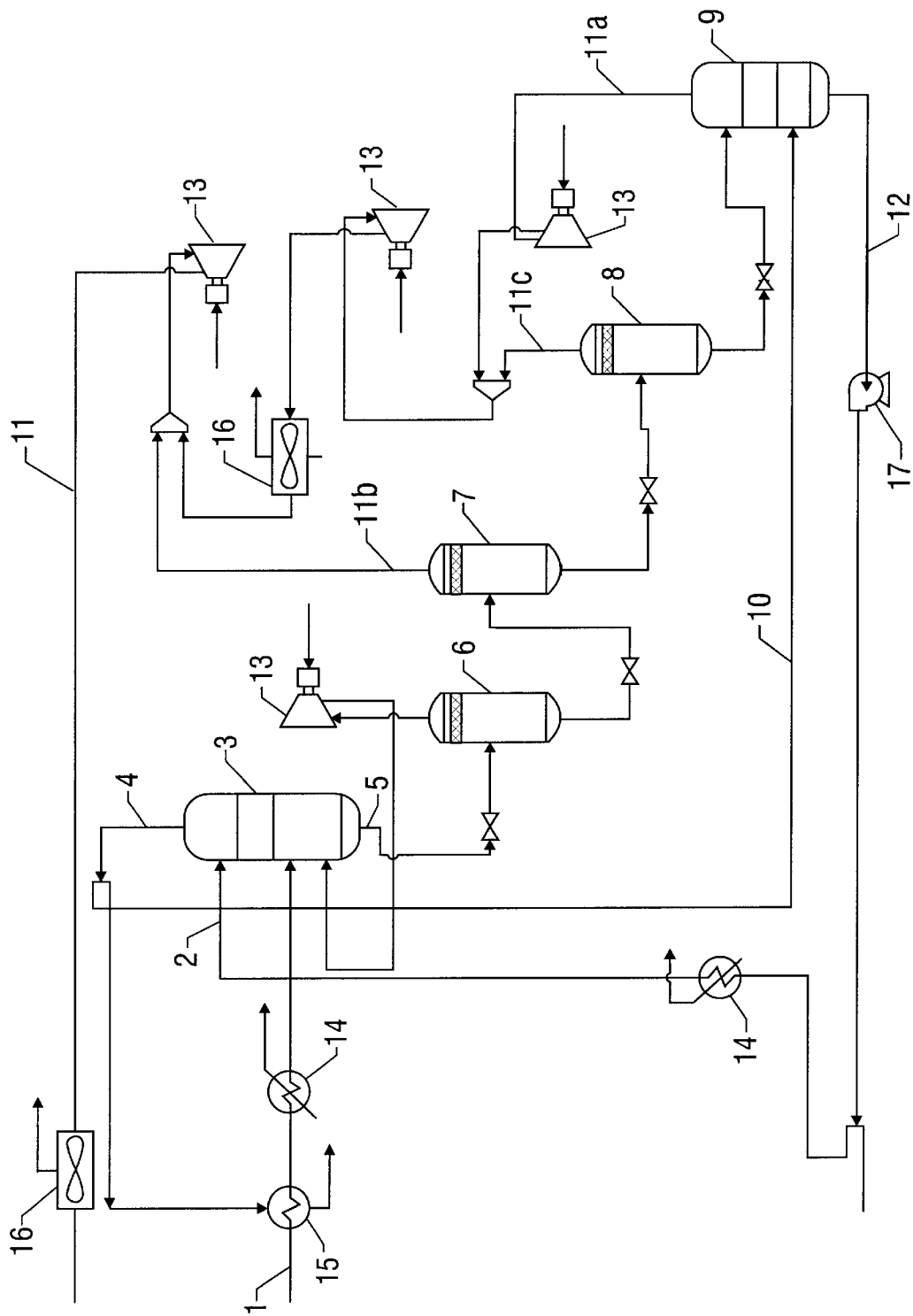
FIG. 2. A process for separating the components of a gas feed stream wherein the process does include a conduit for contacting the rich solvent bottoms with a stripping gas that comprises a portion of the overhead stream.

An apparatus that provides a portion of the overhead stream as a stripping gas is shown in FIG. 2. For comparison, an apparatus that does not provide such a stream is shown in FIG. 1. Referring to FIG. 2, a hydrocarbon feed gas 1 is counter-currently contacted with a lean solvent 2 in an absorber tower 3, generating a first overhead stream 4 and a rich solvent bottoms stream 5. According to FIG. 2, the rich solvent bottoms stream 5 is directed through intermediate flash vaporization towers or stripping towers 6, 7 and 8. The number of intermediate towers can vary, or alternatively, the intermediate towers may not be present at all. The rich solvent bottom stream is directed to a flash vaporization tower 9, where it is contacted with stripping gas 10 and flashed to generate a second overhead stream $11_a$ that is enriched in at least one of the components. Note that in the embodiment depicted in FIG. 2, the product overhead stream 11 is a combination of stripped flash-vaporized gas $11_a$ with the overhead streams $11_b$, and $11_c$ from intermediate stripping towers 7 and 8, respectively. The flash tower 9 also generates a lean solvent bottoms stream 12, which is directed back to absorber tower 3 using pump 17. The stripping gas 10 is a portion of the overhead stream 4. Alternatively, 9 is a stripping tower. The system can also comprise auxiliary components such as compressors 13, chillers 14, heat exchangers 15, and coolers 16.

A comparative apparatus that does not have a means of contacting the rich solvent bottoms with a stripping gas derived from the overhead stream is shown in FIG. 1. Considering a gas feed stream 1 comprising hydrogen and methane as an example, absorption with flash regeneration of solvent effectively recovers high purity $H_2$ 4 as absorber overhead product and $C_1+$ (the lightest absorbed component) 11 as the flash regenerated vapor product. Flash vaporization tower $9_a$ does not have a means of contacting the rich solvent bottoms with a stripping gas. Heavier components remain as solvent bottoms 12. However, the recirculating solvent 12 typically still contains about 0.5–2.0 mol % $C_1$.

According to the present invention FIG. 2, a small portion of the unabsorbed overhead stream 10 (e.g., $H_2$) is used to further strip the lightest absorbed component from the solvent in a flash or distillation column 9. This further stripping of lightest absorbed component increases the ability of recirculated solvent 12 to absorb the desired component from the feed gas. This increase unexpectedly outweighs the loss of the portion of the overhead component that is sacrificed as the stripping gas. Because the overhead component is one of the most valuable products recovered by the process, it would not be obvious to sacrifice a portion of this product to use as a stripping gas. However, this stripping makes the process more efficient, and more is gained than is lost.

According to one embodiment, the lightest absorbed component is the most valuable component recovered. One example is when the lightest absorbed component is methane and the unabsorbed overhead stream 10 is nitrogen. In this case, it would not be obvious to use the unabsorbed overhead stream as a stripping gas, because contacting the absorbed component with this gas stream could potentially contaminate the valuable absorbed component. Surprisingly, this contamination of the product is outweighed by the improvement realized in the removal of the absorbed component from the solvent.

Figure 3:
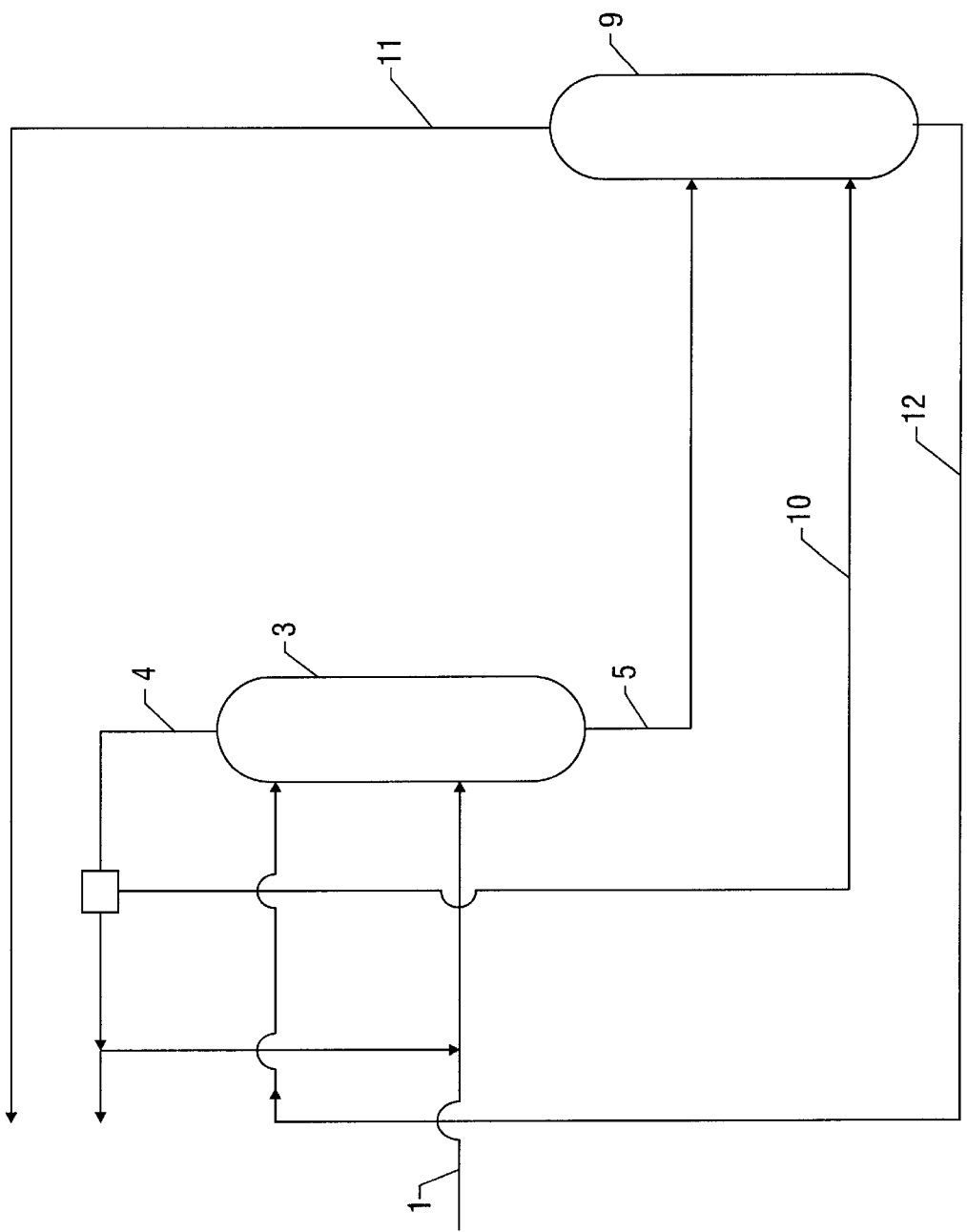
FIG. 3. A simplified view of the basic components for an apparatus for separating the components of a gas feed stream wherein the process includes a conduit for contacting the rich solvent bottoms with a stripping gas that comprises a portion of the overhead stream.

FIG. 3 shows an simplified view of the basic components of the present invention. A gas stream 1 is contacted with a solvent in an absorber tower 3 to produce an overhead stream 4 that is enriched in at least one of the components and a rich solvent bottoms stream 5 that is enriched in at least one the other components. The rich solvent bottoms stream 5 is flashed in at least one reduced pressure stage 9 while it is simultaneously contacted with a stripping gas 10 that comprises a portion of the overhead stream, thereby producing an overhead stream 11 that is enriched in at least one of the components and a lean solvent bottoms stream 12 that is recirculated to the absorber tower 3. In an alternative embodiment of the invention, the rich solvent bottoms are contacted with the stripping gas in a stripping tower as opposed to a flash stage.

An additional embodiment of the invention comprises a recycle stage. The overhead stream released during the flash vaporization can be recompressed to separate the heavier components of this stream via condensation, and then the overhead stream can be directed back to the feed gas absorber after the heavier components have been condensed out.

For example, if hydrocarbon feed gas comprises methane, ethane and propane-plus hydrocarbons, the rich solvent bottoms stream will be enriched in propane-plus hydrocarbons following the initial absorption stage, but will also contain some of the lighter, lower heating value components. The feed gas may contain liquid hydrocarbon as a separate phase and this liquid phase may be fed to the absorber along with the gas. The feed gas may also contain water vapor and/or liquid water. The operating conditions are such that the water does not form hydrates or freeze as a separate phase. The recycle stage can also comprise one or more additional towers to further separate the heavier hydrocarbons as one stream and a light vapor stream to recycle back to the absorber.

Figure 4:
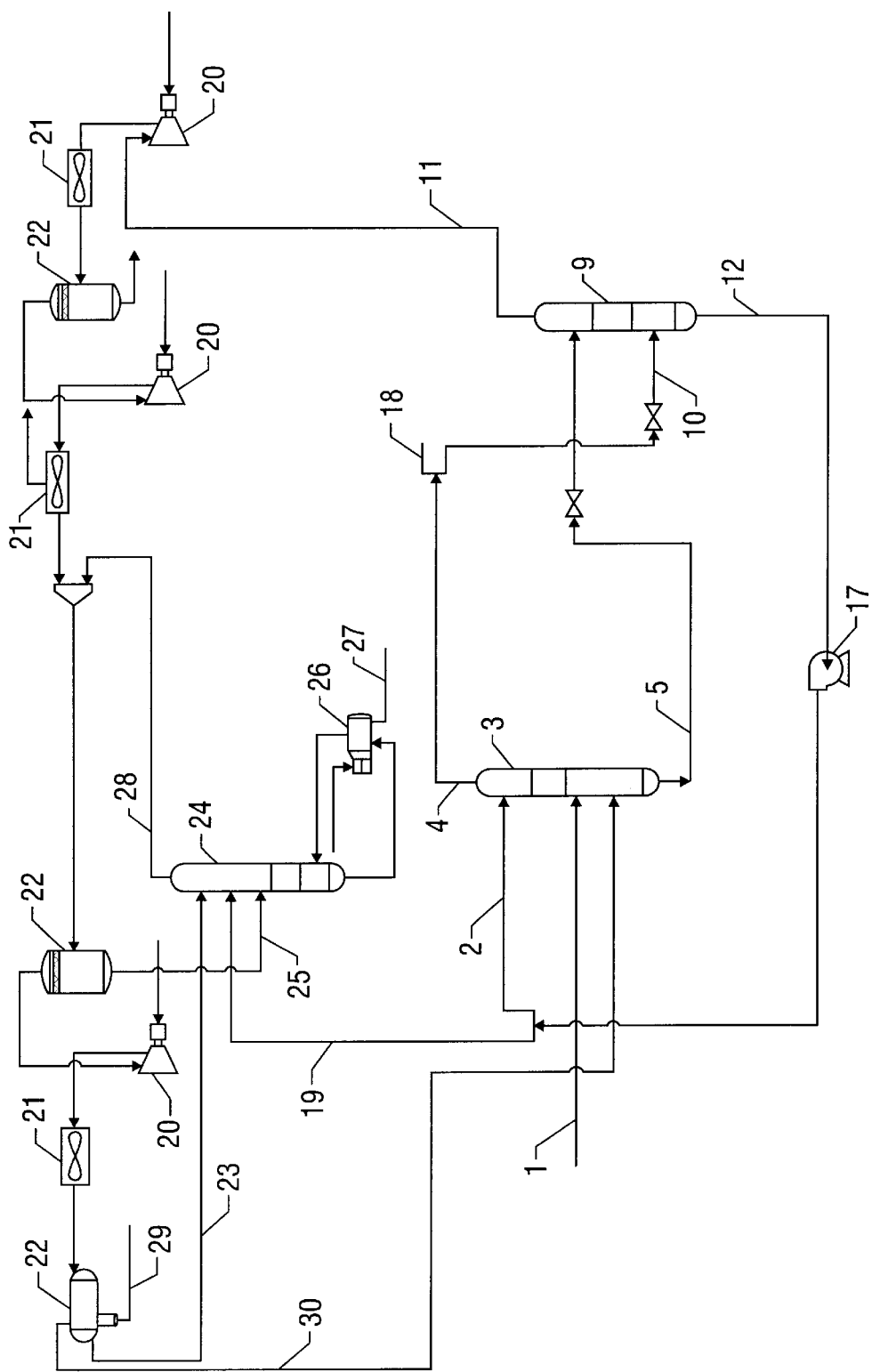
FIG. 4. A process for separating higher heating value components from a hydrocarbon gas feed stream including a recycle stage with removal of higher heating value components by condensation during recompression.

An embodiment comprising a recycle stage is shown in FIG. 4. A hydrocarbon feed gas 1 is countercurrently contacted with lean solvent in absorber tower 3, generating an overhead stream 4 and a rich solvent stream 5. The rich solvent bottoms stream 5 is be directed to flash tower 9, where it is contacted with stripping gas 10 and flashed to generate an overhead stream 11 that is rich in at least one of the higher heating value components of the feed gas 1, and a lean solvent bottoms stream 12. The stripping gas 10 is a portion of the overhead stream 4. The flash tower 9 contains one or more separation stages, and operates at a pressure lower than absorber 3. Pump 17 pumps the lean solvent 12 back to absorber 3. Stream 18, comprising the majority of the absorber overhead gas stream 4, has a lower heating value than feed gas 1. If the amount of high heating value components in the feed is high, the system may produce an excess of lean solvent, which is removed from the absorption/regeneration solvent system as stream 19.

During the recycle stage, stream 11 is compressed by compressors 20, comprising one or more compression stages, with associated compressor stage discharge coolers 21 and compressor stage discharge separators 22. Compressing stream 11, and cooling after compression will cause a portion of this gas to condense in one or more of separators 22, typically with the largest amount of condensation taking place in the highest pressure separator. In FIG. 4, stream 23 is liquid hydrocarbon separated from the vapor stream 11 due to the increase in pressure. Stream 23, along with excess solvent stream 19 comprise the heavier feed components of the feed gas 1, which were removed in the absorption/regeneration system. Tower 24 is a heated stabilizer tower comprising one or more stages that can separate the higher heating value components from feed streams 23 and 19 into a bottoms stream 27 containing the higher heating value components and stream 28 containing lower heating value components, using reboiler 26 to provide heat. Stream 28 can be recycled back through the one or more of the compressors. Liquid separated in one or more of the separators 22 can also be fed to tower 24, as indicated by stream 25. Free liquid water condensed from the feed gas or introduced as liquid water in the feed gas can be separated in separators 22 as a separate liquid phase, indicated for example as stream 29. The remaining vapor phase after the heavier components have been condensed 30 can be recycled back to the absorber 3. According to this embodiment, only two hydrocarbon streams leaving the system; the gas with reduced heating value, stream 18, and the heavier, higher heating value components removed from the feed gas concentrated as stream 27.

EXAMPLE 1

A comparison of a process according to FIG. 1 and an improved process of the present invention according to FIG. 2 was performed using a feed gas of 30 MM scfd at 375 psia, comprising $H_2$ (75%), $C_1$ (10%), $C_2$ (5%) and $C_{3+}$ (10%). Feed gas and solvent were both cooled to $-30°$ F. In the process according to FIG. 1, the first flash operated at 200 psia and the final flash 9 operated at 20 psia. Recovered $H_2$ existed in the system after re-heating as stream $H_2$ product. Recovered $C_{1+}$ was compressed to 380 psia for use as fuel using compressors 13. Chillers 14 used propane refrigerant.

The improved process according to FIG. 2 was operated under the same conditions, the only change being that final flash 9 was replaced by stripping tower wherein the enriched solvent was contacted with a portion of the overhead stream 10. This change allows lower $C_1$ content of the solvent, lower solvent circulation ratio, higher pressure in the first flash, lower refrigeration duty for the solvent, and smaller equipment. Table 1 shows a comparison between the base case according to FIG. 1 and the process of the present invention according to FIG. 2.

TABLE 1

Comparison of Parameters with and without stripping gas.

| | Recovered $H_2$ Purity | $H_2$ % Recovery | Solvent Circulation Rate (lb-moles/hr) | % Cl in Lean Solvent | 1st Flash Pressure (psia) | Total HP Required |
|---|---|---|---|---|---|---|
| FIG. 1 | 94.11 | 94.2 | 20,000 | 0.62 | 200 | 3,936 |
| FIG. 2 | 94.12 | 94.21 | 11,950 | 0.28 | 272 | 3,035 |

EXAMPLE 2

In an apparatus according to FIG. 4, feed gas 1 at a pressure of 620 psia and temperature of 80° F. is fed to the absorber 3. The feed gas comprises 3 MMscfd of hydrocarbon vapor with a heating value of 1171 btu/scf, 27.5 bbl/d of associated condensate liquid hydrocarbon in equilibrium with the feed gas, and 0.2 bbl/d of free water as a separate liquid phase. The feed vapor and liquid hydrocarbons are saturated with water. Recycle gas 30 from the compressor 20 is also fed to the absorber, as is the circulating solvent. The absorber operates at inlet pressure.

Rich solvent is regenerated in the stripper tower 9 at a pressure of 20 psia, using a portion of the absorber overhead gas. Stripper overhead vapor is recompressed to 600 psia in compressor 20, and a portion of the compressed vapor is condensed, and routed to the stabilizer tower 24 for final stabilization of the heavier hydrocarbon components as a propane and heavier liquid product ("propane-plus LPG").

Water removal is not required because the absorber operates at temperatures above the hydrate formation temperature. The stripper pressure is low enough that hydrates will not form and the temperature, even after auto-refrigeration due to pressure reduction, is still above freezing.

Three products are produced from the system: the sales gas 18 with a heating value reduced to 1085 btu/scf, the propane-plus LPG 27 at a rate of 93.5 bbl/d, and free water liquid knock-out stream 29 at a rate of 0.04 bbl/d. Total pump and compressor operating horsepower was 204.

EXAMPLE 3

The feed stream 1 is identical to Example 2. The process used is identical, with the exception that a simple flash is used for regeneration of the solvent, without the use of stripping gas. The same products are produced. The operating horsepower of the pump and compressor increases to 258, because more solvent circulation is required when stripping gas is not used to aid in rejection of higher heating value components from the rich solvent.

All of the methods and apparatuses disclosed herein can be made and executed without undue experimentation in light of the present disclosure. While the methods and apparatuses of this invention have been described in terms of specific embodiments, it will be apparent to those of skill in the art that variations may be applied to the methods and apparatuses and in the steps or in the sequence of steps of the methods described herein without departing from the concept, spirit and scope of the invention. All such similar substitutes and modifications apparent to those skilled in the art are deemed to be within the spirit, scope and concept of the invention as defined by the appended claims.

What is claimed is:

1. A process for separating the components of a hydrocarbon gas feed stream, the gas feed stream comprising a first and second component, the process comprising:

contacting the gas feed stream in an absorber with a solvent to produce a first overhead stream that is enriched in the first component and a rich solvent bottoms stream that is enriched in the second component; and flash vaporizing the rich solvent bottoms stream in at least one reduced pressure stage while simultaneously contacting the solvent bottoms stream with a stripping gas that comprises a portion of the first overhead stream to produce a second overhead stream that is enriched in the second component and a lean solvent stream that is returned to the absorber.

2. The process of claim 1, wherein the gas feed stream comprises components selected from the group consisting of hydrogen, nitrogen, methane, ethylene, ethane, $C_{3+}$ saturated and $C_{3+}$ unsaturated hydrocarbons and mixtures thereof.

3. The process of claim 1, wherein the hydrocarbon gas feed stream comprises methane and hydrogen.

4. The process of claim 1, wherein the first overhead stream is enriched with hydrogen.

5. The process of claim 1, wherein the rich solvent bottoms is enriched with methane.

6. The process of claim 1, wherein the hydrocarbon gas feed stream comprises methane and nitrogen.

7. The process of claim 1, wherein the first overhead stream is enriched with nitrogen.

8. The process of claim 1, wherein the solvent is one of the components of the hydrocarbon gas feed stream.

9. The process of claim 1, wherein the solvent is the heaviest component of the gas feed stream.

10. The process of claim 1, wherein the solvent is selected from the group consisting of paraffinic solvents, naphthenic solvents, benzene and toluene.

11. The process of claim 1, wherein the hydrocarbon gas feed stream is counter-currently contacted with the solvent.

12. The process of claim 1, wherein the second overhead stream comprises at least one heavier component and at least one lighter components, the process further comprising a recycling stage for compressing the second overhead stream to condense a portion of the at least one heavier component from the second overhead stream and for directing the second overhead stream back to the absorber.

13. A apparatus for separating the components of a hydrocarbon gas feed stream, the gas feed stream comprising at least a first and second component, the apparatus comprising:

an absorber for contacting the gas feed stream with a solvent to produce a first overhead stream that is enriched in the first component and a rich solvent bottoms stream that is enriched in the second component;

at least one reduced pressure stage for flash vaporizing the rich solvent bottoms stream to produce a lean solvent bottoms stream and a second overhead stream that is enriched in the second component;

a conduit for providing a portion of the first overhead stream to at least one of the reduced pressure stages for simultaneously contacting the rich solvent bottoms stream with a stripping gas that comprises a portion of the first overhead stream; and a conduit for returning the lean solvent bottoms stream to the absorber.

14. The apparatus of claim 13, wherein the gas feed stream is counter-currently contacted with the solvent.

15. The apparatus of claim 13, wherein the solvent comprises the heaviest component of the gas feed stream.

16. The apparatus of claim 13, wherein the solvent is selected from the group consisting of paraffinic solvents, naphthenic solvents, benzene and toluene.

17. The apparatus of claim 13, wherein the hydrocarbon gas feed stream comprises components selected from the group consisting of hydrogen, nitrogen, methane, ethylene, ethane, $C_{3+}$ saturated and $C_{3+}$ unsaturated hydrocarbons and mixtures thereof.

18. The apparatus of claim 13, wherein the hydrocarbon gas feed stream comprises methane and hydrogen.

19. The apparatus of claim 13, wherein the first overhead stream is enriched with hydrogen.

20. The apparatus of claim 13, wherein the rich solvent bottoms is enriched with methane.

21. The apparatus of claim 13, wherein the hydrocarbon gas feed stream comprises methane and nitrogen.

22. The apparatus of claim 13, wherein the first overhead stream is enriched with nitrogen.

23. The apparatus of claim 13, wherein the second overhead stream comprises at least one heavier component and at least one lighter components, the apparatus further comprising a recycling stage for compressing the second overhead stream to condense a portion of the at least one heavier component from the second overhead stream and for directing the second overhead stream back to the absorber.

* * * * *